G. E. BELCHER.

LAST BLOCK FASTENER.

No. 10,534. Reissued Oct. 28, 1884.

Witnesses.
A. L. White
H. Brown.

Inventor.
Geo. E. Belcher
by Wright & Brown
Attys

N. PETERS, Photo-Lithographer, Washington, D. C.

UNITED STATES PATENT OFFICE.

GEORGE E. BELCHER, OF STOUGHTON, MASSACHUSETTS.

LAST-BLOCK FASTENER.

SPECIFICATION forming part of Reissued Letters Patent No. 10,534, dated October 28, 1884.

Original No. 300,195, dated June 10, 1884. Application for reissue filed September 23, 1884.

*To all whom it may concern:*

Be it known that I, GEORGE E. BELCHER, of Stoughton, in the county of Norfolk and State of Massachusetts, have invented certain Improvements in Last-Block Fasteners, of which the following is a specification.

This invention has for its object to provide an improved last-block fastener of simple construction adapted to automatically secure or lock the block to the last, so that the two cannot become accidentally separated, and also adapted to be readily operated to release the block by means of the last-hook. The invention also has for its object to improve the means for securing the lower or forward end of the block to the last.

To these ends my invention consists in the improvements which I will now proceed to describe and claim.

Figure 1:
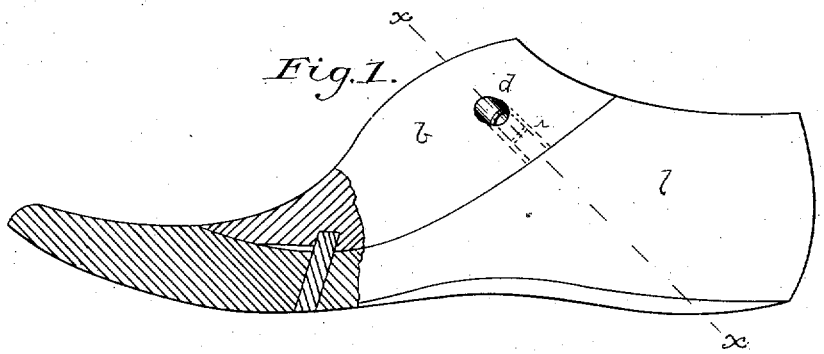
Figure 2:
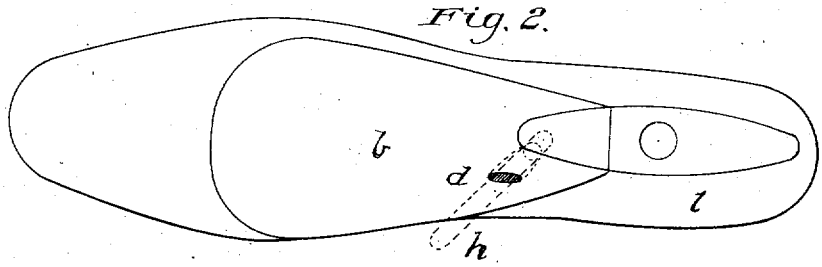
Figure 3:
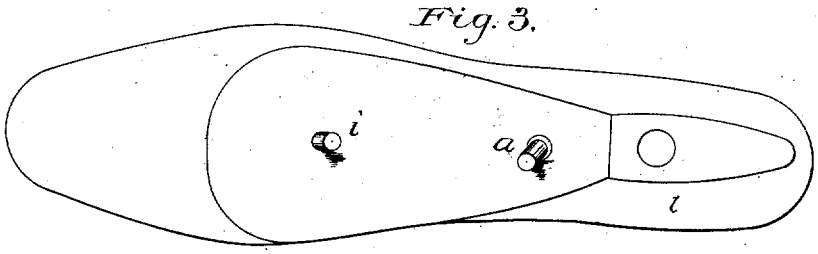
Figure 4:
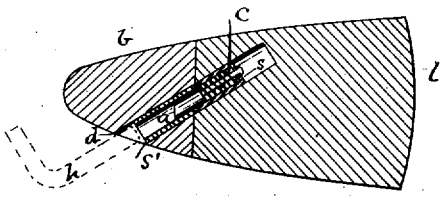

Of the accompanying drawings, forming a part of this specification, Figure 1 represents a side elevation and partial section of a last and block provided with my improvement. Fig. 2 represents a top view of the same. Fig. 3 represents a top view of the last without the block. Fig. 4 represents a section on line *x x*, Fig. 1.

The same letters of reference indicate the same parts in all the figures.

In carrying out my invention I provide the last *l* with a spring-bolt, *a*, held in a suitable socket inserted in the portion of the last on which the block bears, and pressed outwardly by a spring, *c*. In order that the spring-bolt *a* may not slip up the orifice *d*, and thus disengage the block *b* from the last *l* when not desired, I reduce the end of it, as shown clearly in Fig. 4, and pass it completely through the spring *c* and through a hole in the bottom of the socket *s*, and then rivet over the end of it, so that it cannot slip forward out of the socket, but can be pressed, when desired, by means of the last-hook *h*, backward against the spring *c*. The socket *s* is driven tightly into the last *l*. In the block *b*, I provide an orifice, *d*, extending entirely through the block, and so arranged as to receive the bolt *a* when the block is in its proper position on the last. A small tube, *s'*, is also driven tightly into the block *b*, to receive the end of the bolt *a* and preserve the edges of the orifice *d* from wearing away. The extension of the orifice *d* through the block or to its outer surface enables a last-hook to be inserted in said orifice and press the bolt *a* backwardly until the block is released, the block being then removed by the hook. I arrange the bolt *a* and orifice *d* diagonally, as shown in the drawings, so that the outer end of the orifice will be at one side of the center or instep portion of the block, this portion being most conveniently reached by the last-hook *h* when a boot or shoe is on the last, because the hook is enabled, by the arrangement of the orifice and bolt, to enter the orifice diagonally from the side of the last, as shown in dotted lines in Figs. 2 and 4, when it is being inserted, and therefore the upper does not have to be displaced or crowded away from the block to any considerable extent to permit the insertion of the hook into the hole in the block, and at the same time, when inserted in the orifice, is firmly engaged with the block, so that it will not slip when it is pulling out the block. Heretofore the hole for the insertion of the last-hook has been made either crosswise of the block, so that the hook has to stand out from the side of the last when its point is being inserted in the hole, or downward from the top of the block, so that it cannot take so firm a hold of the block, and is liable to slip in drawing out the block. The advantage of my improved arrangement will be readily seen.

In sawing the block from the last I carry the line of the cut to the surface of the last at a gradual curve at the lower end of the block. To secure the lower end of the block I insert a dowel or pin, *i*, in the bottom of the last, said pin projecting diagonally upward and backward toward the heel and entering a hole formed in the block. The diagonal arrangement of the pin *i* prevents the lower end of the block from being raised. The absence of a shoulder on the last at the lower or forward end of the block enables the last to be more easily withdrawn from a boot or shoe, the shoulder being liable to catch the lining of a boot or shoe when the last is being removed.

I am aware that it is not new to provide a last with a spring-bolt projecting upwardly into a vertical hole formed through the center of the block, and therefore I do not claim, broadly, such means of securing the block.

I am also aware that it is not new to form a last having a seat for the block without an angular shoulder at the lower end of such seat.

I claim—

1. The combination of the last having the diagonally-arranged fastener consisting of bolt *a*, socket *s*, and spring *c*, with the block having the diagonally-arranged orifice *d*, provided with the tube *s'*, adapted to receive said bolt and extending to the outer surface of the block.

2. The last formed without a shoulder at the lower or forward end of the surface on which the block rests, and having the diagonal or backwardly-inclined pin or dowel *i*, combined with the block having a diagonal hole to receive said pin, as set forth.

In testimony whereof I have signed my name to this specification, in the presence of two subscribing witnesses, this 5th day of September, 1884.

GEORGE E. BELCHER.

Witnesses:

ELLIOT A. CURTIS,

FRED H. WHITE.